United States Patent [19]
Benayoun et al.

[11] Patent Number: 6,128,761
[45] Date of Patent: Oct. 3, 2000

[54] METHOD AND APPARATUS FOR G.706 FRAME ALIGNMENT AND CRC PROCEDURE TEST TOOL

[75] Inventors: Alain Benayoun, Cagnes-sur-Mer; Jean-Francois Le Pennec, Nice; Patrick Michel, La Gaude; Jean-Louis Clara, La Colle-sur-loup; Jacques Cresp, Nice, all of France

[73] Assignee: Cisco Technology, Inc., San Jose, Calif.

[21] Appl. No.: 08/986,830

[22] Filed: Dec. 8, 1997

[30] Foreign Application Priority Data

Dec. 13, 1996 [EP] European Pat. Off. .............. 96480114

[51] Int. Cl.[7] .................................................. H03M 13/00
[52] U.S. Cl. ............................................................ 714/758
[58] Field of Search ..................... 714/758, 752, 714/746; 370/241; H04M 3/00; H04J 3/00

[56] References Cited

U.S. PATENT DOCUMENTS

| | | | |
|---|---|---|---|
| 5,138,608 | 8/1992 | Kucera et al. | 370/244 |
| 5,377,209 | 12/1994 | Skinner et al. | 370/458 |
| 5,504,753 | 4/1996 | Renger et al. | 714/712 |
| 5,621,720 | 4/1997 | Bronte et al. | 370/241 |

FOREIGN PATENT DOCUMENTS

0675624A1  4/1995  European Pat. Off. ....... H04M 03/30

*Primary Examiner*—Albert De Cady
*Assistant Examiner*—Shelly A Chase
*Attorney, Agent, or Firm*—Cesari and McKenna

[57] ABSTRACT

This invention describes a test tool based on a PC workstation. This test tool is used to validate any E1 framing telecommunication device. In order to comply with the CCITT G.706 recommendations, a device has to pass a series of test cases that are predetermined. Each test case contains test sequences according to the CCITT G.706 specifications. The purpose of this test tool is to generate a set of stimuli in the transmission mode, whereas in the reception mode, the value of the data returned by the tested device is analyzed and compared with the expected response. The data bytes are structured as for E1 multiframe format containing 16 frames of 32 timeslots, where each timeslot is a data byte. According to the G.706 recommendations, timeslot 0 is dedicated to the frame and multiframe alignment and to the CRC test. The test tool enables generating of the content of the 8-bit timeslot 0 of each frame and therefore modifying the frame alignment, the multiframe alignment and the CRC procedure test tool; and storing the content of the received 8-bit timeslot 0 to monitor the remote alarm indication bit ('A' bit) reflecting the behavior of the tested device so as to determine whether this latter conforms to the CCITT G.706 recommendations.

13 Claims, 13 Drawing Sheets

FIG. 1

| | SUB-MULTIFRAME | FRAME NUMBER | BIT VALUE FOR THE SLOT 0 | | | | | | | |
|---|---|---|---|---|---|---|---|---|---|---|
| | | | 1 | 2 | 3 | 4 | 5 | 6 | 7 | 8 |
| MULTI-FRAME | I | 0 | C1 | 0 | 0 | 1 | 1 | 0 | 1 | 1 |
| | | 1 | 0 | 1 | A | Sn0 | Sn1 | Sn2 | Sn3 | Sn4 |
| | | 2 | C2 | 0 | 0 | 1 | 1 | 0 | 1 | 1 |
| | | 3 | 0 | 1 | A | Sn0 | Sn1 | Sn2 | Sn3 | Sn4 |
| | | 4 | C3 | 0 | 0 | 1 | 1 | 0 | 1 | 1 |
| | | 5 | 1 | 1 | A | Sn0 | Sn1 | Sn2 | Sn3 | Sn4 |
| | | 6 | C4 | 0 | 0 | 1 | 1 | 0 | 1 | 1 |
| | | 7 | 0 | 1 | A | Sn0 | Sn1 | Sn2 | Sn3 | Sn4 |
| | II | 8 | C1 | 0 | 0 | 1 | 1 | 0 | 1 | 1 |
| | | 9 | 1 | 1 | A | Sn0 | Sn1 | Sn2 | Sn3 | Sn4 |
| | | 10 | C2 | 0 | 0 | 1 | 1 | 0 | 1 | 1 |
| | | 11 | 1 | 1 | A | Sn0 | Sn1 | Sn2 | Sn3 | Sn4 |
| | | 12 | C3 | 0 | 0 | 1 | 1 | 0 | 1 | 1 |
| | | 13 | Si | 1 | A | Sn0 | Sn1 | Sn2 | Sn3 | Sn4 |
| | | 14 | C4 | 0 | 0 | 1 | 1 | 0 | 1 | 1 |
| | | 15 | Si | 1 | A | Sn0 | Sn1 | Sn2 | Sn3 | Sn4 |

THE FOLLOWING TEST CASE DESCRIBES THE TEST PROCEDURE
ETS 300 011 C.4.4 ENTITLED "CRC MULTIFRAME ALIGNMENT":

| STIMULUS | MONITOR |
|---|---|
| /FAS, BIT2=1, /FAS, BIT2=1 | NOF |
| /FAS, BIT2=1 | RAI |
| MFB | NOF |
| X250 | INTERMITTENT RAI |
| MFB | RAI |
| MFA, 4XMFB | RAI |
| MFA, 2XMFB, MFA | |
| MFA, 2XMFB, 2XMFA | NOF |
| MFB, MFA | NOF |

FIG. 10

| | |
|---|---|
| /FAS | NOF |
| BIT2=1 | NOF |
| /FAS | NOF |
| BIT2=1 | NOF |
| /FAS | NOF |
| BIT2=1 | RAI |
| FAS | RAI |
| BIT2=1 | RAI |
| FAS | RAI |
| BIT2=1 | NOF |

METHOD AND APPARATUS FOR G.706 FRAME ALIGNMENT AND CRC PROCEDURE TEST TOOL

BACKGROUND OF THE INVENTION

1. Field of the Invention

The present invention relates to a method and an apparatus for determining the conformity of an attached telecommunication device to test procedures and, more particularly, to a method and apparatus for aligning G.706 frames and multiframe and handling a Cyclic Redundancy Check (CRC) procedure test.

2. Background Art

Any G.706 telecommunication adapter or device designed for the European market needs to comply with the CCITT G.706 recommendation to be homologated. The CCITT G.706 defines for the E1 speed a number of specifications dedicated to the Cyclic Redundancy Check (CRC) handling and the frame synchronization.

Figure 1:
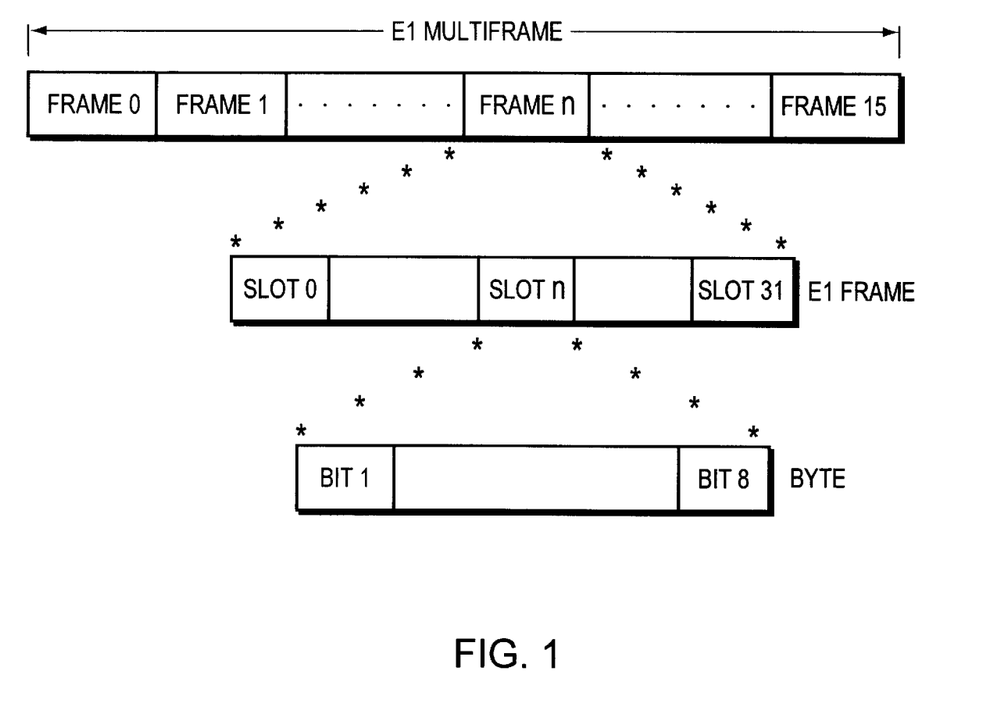
FIG. 1 illustrates an E1 frame format.

FIG. 1 shows the format of E1 frames. An E1 multiframe is made of 16 consecutive E1 frames and lasts 2 ms. An E1 frame is made of 32 timeslots and lasts 125 us. Each timeslot or slot is 8-bits long. Timeslot 0 is dedicated to the frame and multiframe alignments and the CRC test, whereas the other timeslots 1–31 are dedicated to the users. A timeslot corresponds to each user.

Figure 2:
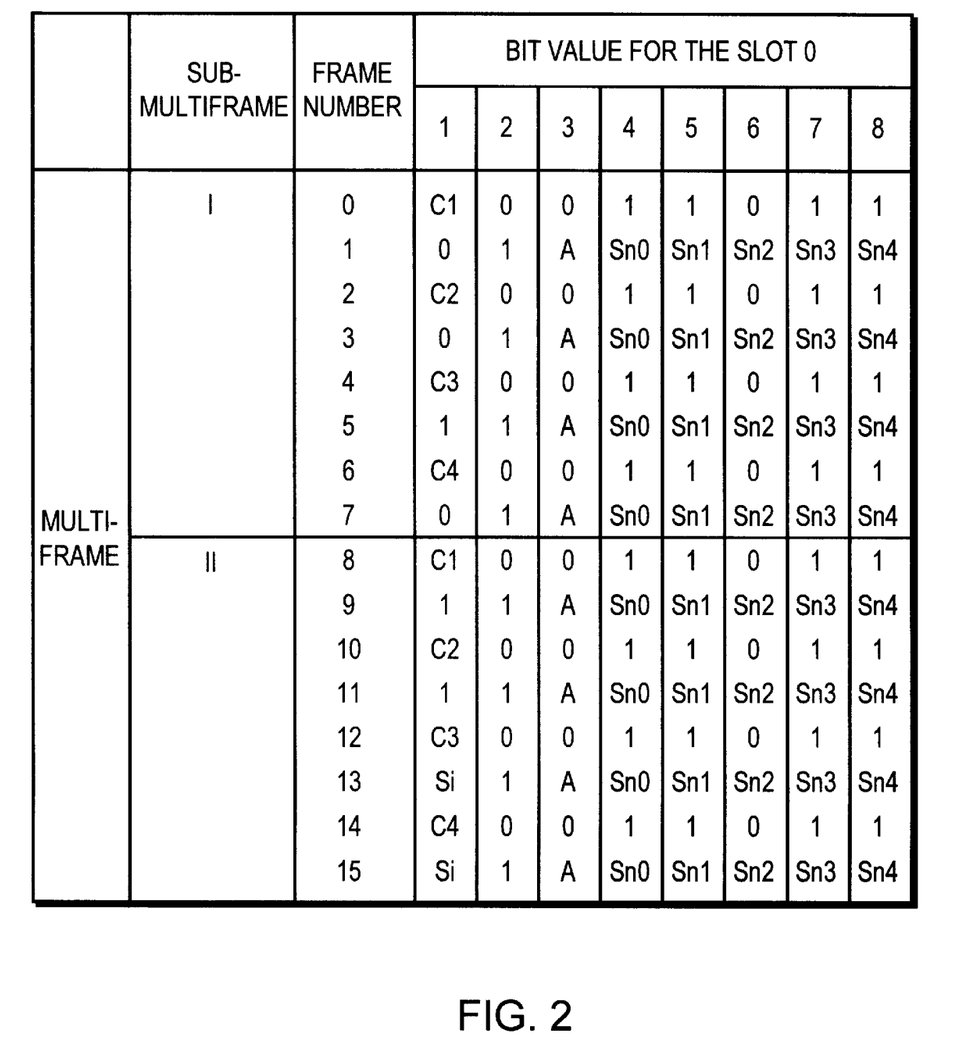
FIG. 2 illustrates an E1 multiframe structure.

FIG. 2 gives the E1 multiframe structure. Slot 0 of each frame carries a pattern. The even frames carry the Frame Alignment Signal (FAS) on bits 2–8 having a pattern '0011011' and are used for the frame alignment. The odd frames carry bit 2=1 and are used for the multiframe alignment checking. Bit A, which corresponds to a remote alarm indication, is carried on bit 3 of odd frames. Each sub-multiframe has a 4-bit (C1–C4) CRC of the E1 multiframe and are carried on even frames. The other bits, such as Bits Si, are spare bits for international usage (also called E-bits) and Bits Sn are spare bits for national usage are of less importance.

SUMMARY OF THE INVENTION

In order to comply with CCITT G.706 recommendation, a device has to satisfy a series of test cases that are predetermined. Each test case contains test sequences according to the CCITT G.706 specification.

Figure 3:
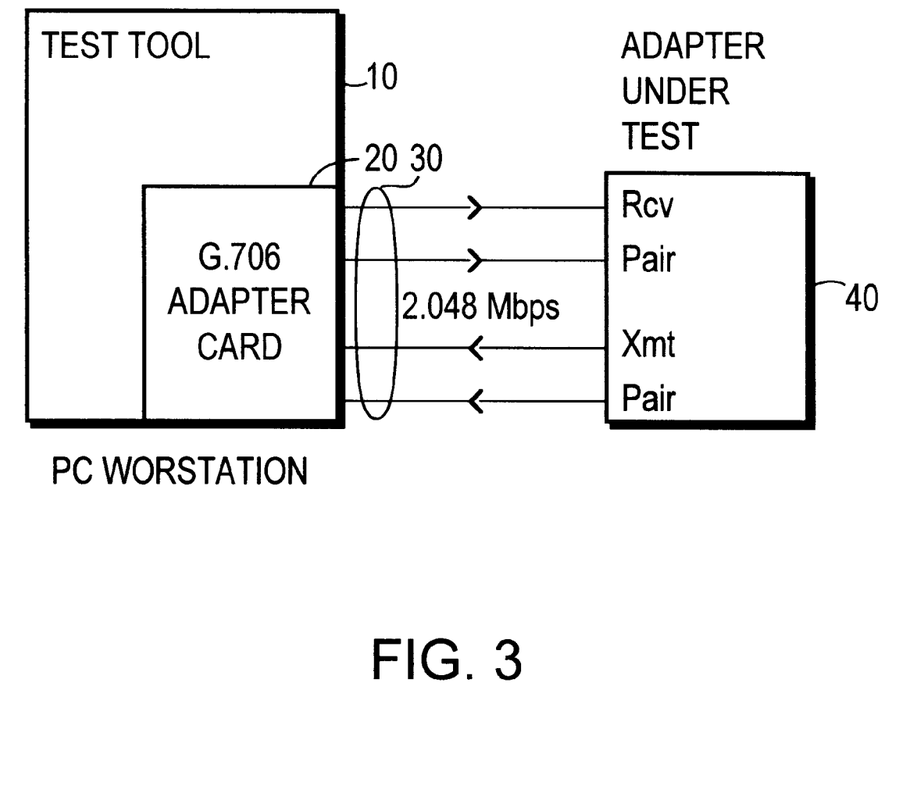
FIG. 3 shows the environment of the Test Tool Configuration.

This invention describes the hardware and software of a test tool based on a PC workstation as described in FIG. 3. The test tool provides the following main functions in order to test an attached device:

To generate the content of the 8-bit timeslot 0 of each frame and therefore to modify the frame alignment, the multiframe alignment and the CRC procedure test tool; and To store the content of the received 8-bit timeslot 0 to monitor the remote alarm indication bit ('A' bit) reflecting the behavior of the tested device so as to determine whether this latter conforms to the CCITT G.706 recommendations.

Thus, this test tool generates automatically a set of stimuli in accordance with the CCITT G.706 recommendations, to analyze and to compare the value of the data returned by the tested device with the expected response. With respect to the CCITT G.706, the nature of timeslot 0 is considered, but the implementation of the present invention may be generalized to any other timeslot so as to analyze and to compare its content to the expected response.

DETAILED DESCRIPTION OF THE PREFERRED EMBODIMENTS

FIG. 3 shows the environment in which the preferred embodiment of the invention is implemented. The hardware and software of the test tool, according to the present invention, are included in the G.706 adapter card (20) which is connected to a PC Board (10). The adapter card is also connected to a device to be tested by network lines (30) having transmit and receive pairs which operate at 2.048 Mbps.

HARDWARE DESCRIPTION OF THE INVENTION

Figure 4A:
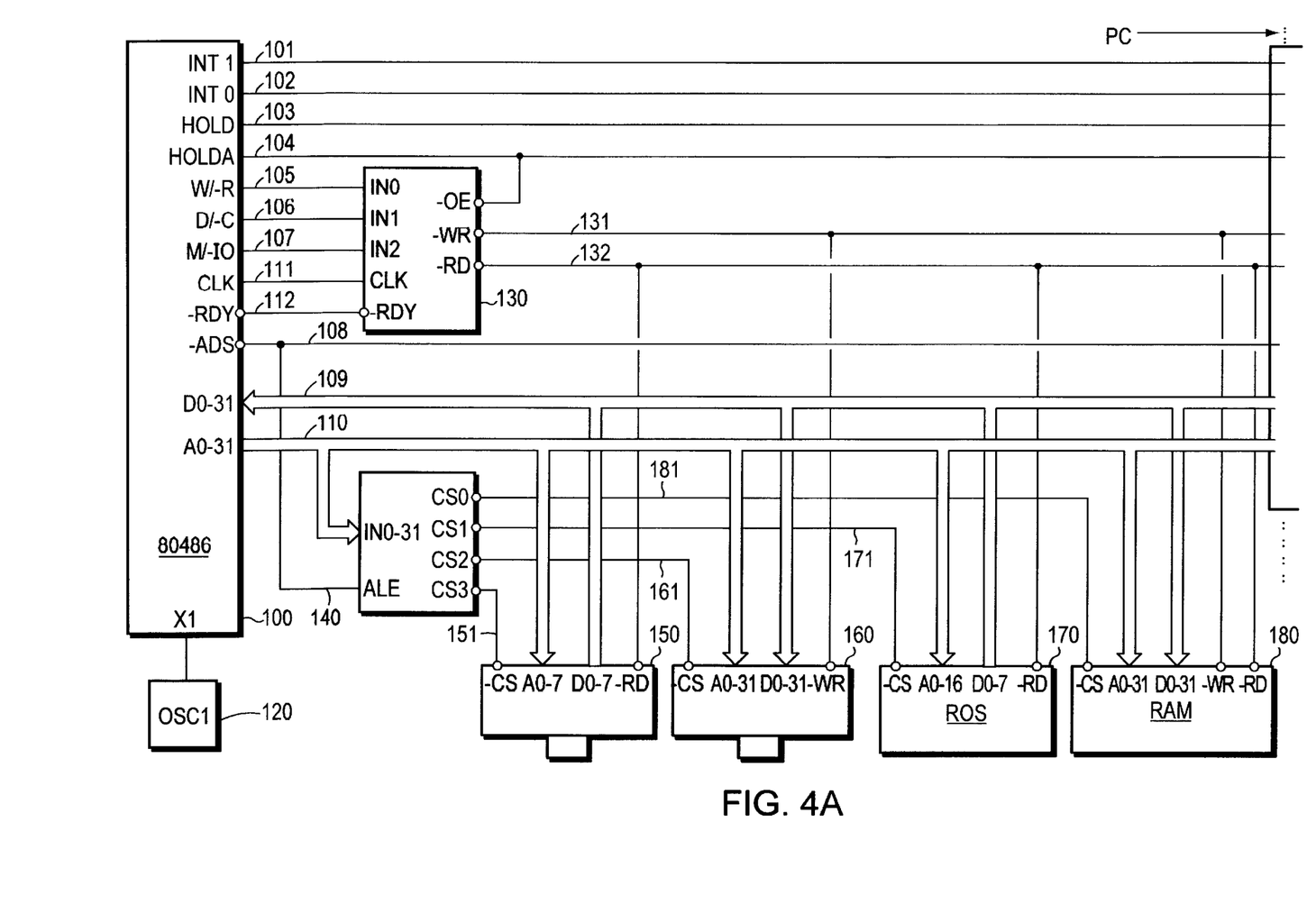
FIGS. 4A–4B show the hardware implementation of the invention.
Figure 4B:
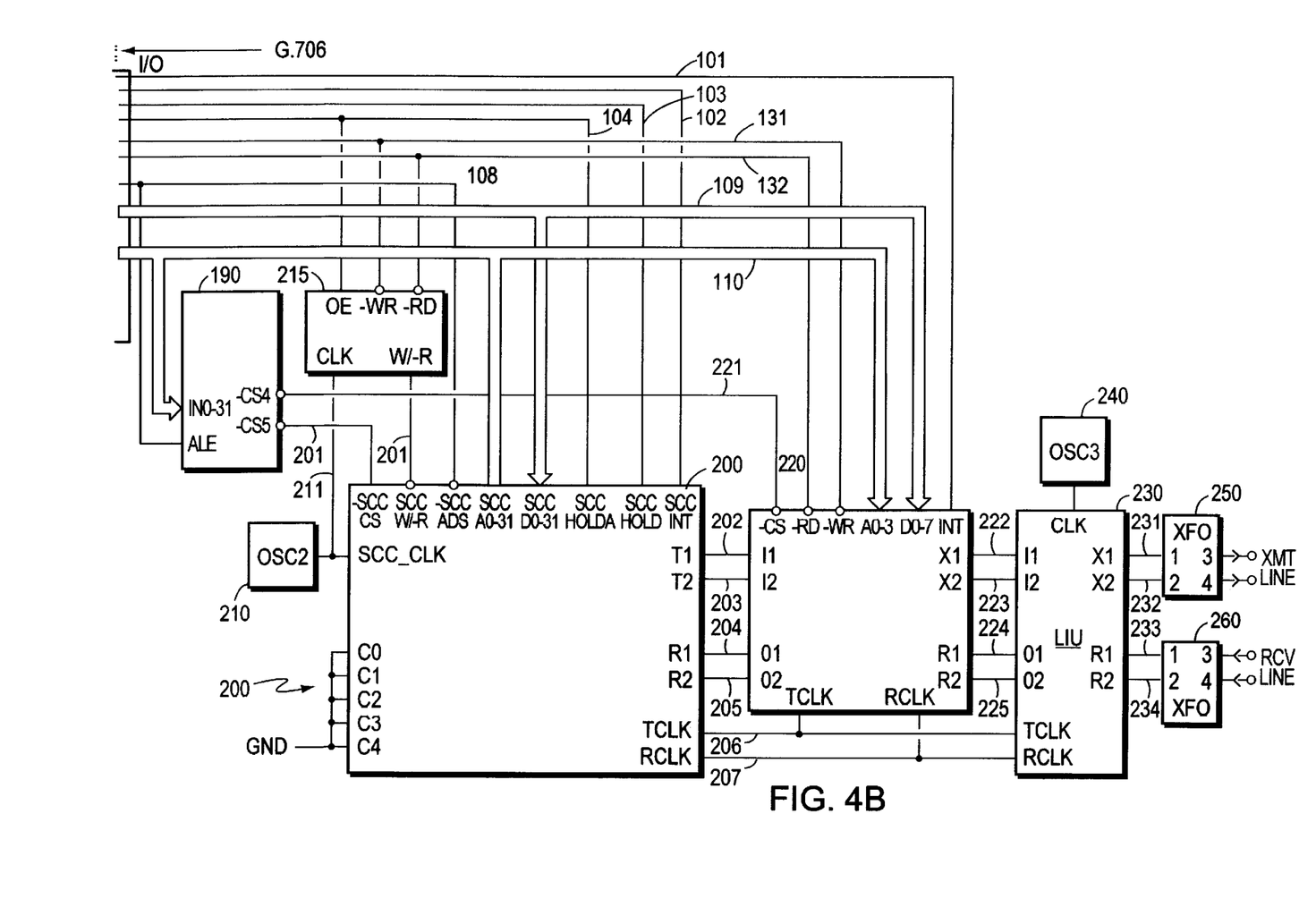

The hardware architecture, according to the present invention, is illustrated in FIGS. 4A and 4B.

Input interrupt pins INT0 and INT1 of a microprocessor (100) of the type 80486 are respectively connected by leads (102,101) to an output interrupt pin SCC_INT of a 32-channel HDLC controller (200) and an output interrupt pin INT of a framer (220). Many types of framers can be used such as Siemens PEB2035, for instance. A 32-channel HDLC controller that can be used is also a Siemens PEB20320. The microprocessor (100) has an input clock pin X1 which is connected to an output pin of an oscillator 1 (120) providing a free-running clock.

Microprocessor (100) has an input bus request, pin HOLD, which is connected by lead (103) to HDLC controller (200) by an output bus request, pin SCC_HOLD. Conversely, an output bus acknowledge, pin HOLDA, is connected by lead (104) to an input bus acknowledge, pin SCC_HOLDA of HDLC controller (200). This lead (104) is also connected to an input output enable, pin -O of a control logic 1 (130) and to the input output enable, pin OE of a control logic 2 (215).

The microprocessor has an output read/write, pin W/-R, which is connected by lead (105) to an input pin IN0 of control logic 1 (130). Its output data/control, pin D/-C, is connected by lead (106) to an input pin IN1 of control logic 1 (130). Its output memory/IO, pin M/-IO, is connected by lead (107) to an input pin IN2 of control logic 1 (130). In the same way, its output clock, pin CLK, is connected by lead (111) to an input clock pin CLK of control logic 1. Its input ready pin -RDY is connected by lead (112) to an output ready pin -RDY of control logic 1 (130).

Microprocessor (100) also has an output address data store, pin -ADS connected by lead (108) to input address latch enable pins ALE of address decodes 1 and 2 (140,190) and to an input address data store pin -SCC_ADS of HDLC controller (200). Its bidirectional data bus (109) is connected through pins D0–31 to input bus, pins D0–31 of a display interface logic (160), to a bidirectional data bus, pins D0–31 of a RAM (180) and to a bidirectional data bus, pins SCC_D0–31 of HDLC controller (200). In addition, the lowest data byte of data bus (109) is also connected to an output data bus, pins D0–7 of a keyboard interface logic (150), to an output data bus, pins D0–7 of a Read Only Storage ROS (170) and to a bidirectional data bus, pins D0–7 of framer (220). Conversely, its output address bus (110) is connected through pins A0–31 to an input address bus, pins A0–31 of address decode 1 (140), to an input address bus, pins A0–31 of display interface logic (160), to an input address bus, pins A0–31 of RAM (180), to an input address bus, pins A0–31 of address decode 2 (190) and to an output address bus, pin SCC_A0–31 of HDLC controller (200). In addition, part of address bus (110) is also connected to an input address bus, pins A0–7 of keyboard interface logic (150), to an input address bus, pins A0–16 of ROS (170) and to an input address bus, pins A0–3 of framer (220).

Chip select outputs, pins -CS0, -CS1, -CS2 and -CS3 of address decode 1 (140) are respectively connected to chip select inputs, pin -CS of RAM (180) on lead (181), pin -CS of ROS (170) on lead (171), pin -CS of display interface logic (160) on lead (161) and to pin -CS of keyboard interface logic (150) on lead (151). Conversely, chip select outputs, pin -CS4 and -CS5 of address decode 2 (190) are respectively connected to chip select inputs, pin -CS of framer (220) on lead (221) and pin -SCC_CS of HDLC controller (200) on lead (201).

Pin -WR of control logic 1 (130) is connected by a bidirectional write lead (131) to write inputs, pins -WR of display interface logic (160), of RAM (180), of framer (220) and to a write output, pin -WR of control logic 2 (215). In the same way, pin -RD of control logic 1 (130) is connected though a bidirectional read lead (132) to read inputs, pins -RD of keyboard interface logic (150), of ROS (170), of RAM (180), of framer (220) and to a read output, pin -RD of control logic 2 (215).

HDLC controller (200) has a read/write output, pin SCC_W/-R connected to a read/write input, pin W/-R of control logic 2 (215). Its clock input, pin SCC_CLK is connected by lead (211) to an output of an oscillator 2 (210) providing a free-running clock. This free running clock is also provided to a clock input, pin CLK of control logic 2 (215). An init input bus, pins C0–C4 of HDLC controller (200) is connected to the ground. Positive and negative transmit data outputs, pins T1 and T2 of HDLC controller (200) are respectively connected by leads (202,203) to inputs, pins I1 and I2 of framer (220). Additionally, its positive and negative receive data inputs, pins R1 and R2 are respectively connected by leads (204,205) to outputs, pins O1 and O2 of framer (220).

Positive and negative transmit data outputs, pins X1 and X2 of framer (220) are respectively connected by leads (222,223) to inputs, pins I1 and I2 of a Line Interface Unit (230) which is for instance a Siemens PEB22320. In the same way, its positive and negative receive data inputs, pins R1 and R2 are respectively connected by leads (224,225) to outputs, pins O1 and O2 of Line Interface Unit (230). This latter has a transmit clock output, pin TCLK connected to inputs, pins TCLK of framer (220) and of HDLC controller (200) by lead (206). Conversely, its receive clock output, pin RCLK is connected to inputs, pins RCLK, of framer (220) and HDLC controller (200) by lead (207). Its free-running clock is provided on its input, pin CLK by an oscillator 3 (240).

Positive and negative transmit data output, pins X1 and X2 of Line Interface Unit (230) are respectively connected by leads (231,232) to pins 1 and 2 of a transformer (250). Thus, its positive and negative receive data inputs, pins R1 and R2 are respectively connected by leads (233,234) to pins 1 and 2 of a transformer (260). Pins 3 and 4 of transformers (250,260) are respectively connected to an external connector for the network transmit and receive twisted pairs.

The keyboard interface logic (150) provides an external connector to plug a keyboard so does the display interface logic (160) which also provides an external connector to plug a display.

In this hardware description the PC system board is made of a processor (100), an oscillator 1 (120), a control logic 1 (130), a address decode 1 (140), a keyboard interface logic (150), a display interface logic (160), a ROS (170) and a RAM (180). The G.706 adapter card is made of an address decode 2 (190), a 32-channel HDLC controller (200), an oscillator 2 (210), a control logic 2 (215), a framer (220), a Line Interface Unit (230), an oscillator 3 (240), a transmit transformer (250) and a receive transformer (260).

FUNCTIONAL HARDWARE DESCRIPTION OF THE INVENTION

Principle of Operation

An E1 network link is controlled by three main components: the Line Interface Unit (230), the framer (220) and the 32-channel HDLC controller (200).

The main functions of Line Interface Unit (230) are the E1 network interface (pulse shaping, jitter), the clock generation and the receive data recovery.

The main functions of framer (220) are the frame and multiframe management and the error checking through timeslot 0. In the present invention, the framer is programmed in a transparent mode. In transmission mode, the content of timeslot 0 is not generated by the framer itself but provided to the framer by the HDLC controller (200); in reception mode, the data carried by timeslot 0 is analyzed by the framer and then transmitted to the HDLC controller (200) without any modification. When the framer detects an error, it activates its interrupt signal (101) to alert processor (100).

It should be noticed that the preferred embodiment is focused on the timeslot 0, but this should not be limited to this unique timeslot. Any other timeslot of the frame may be used such as timeslots 15 or 30 in case they contain information that is to be generated or amended according to the CCITT recommendations.

The main function of the 32-channel HDLC controller (200) is to provide 32 independent HDLC controllers, one per timeslot, for both transmit and receive directions. A 32-channel controller is chosen in this invention so as to respect the recommendation of the G 706 CCITT. However, any other N-channel may be implemented as long as there are N slots in the frames operating at a different network speed, higher or lower, such as T1 links. In this preferred embodiment, the Siemens PEB20320 operates as a master with the main memory (180).

Figure 5:
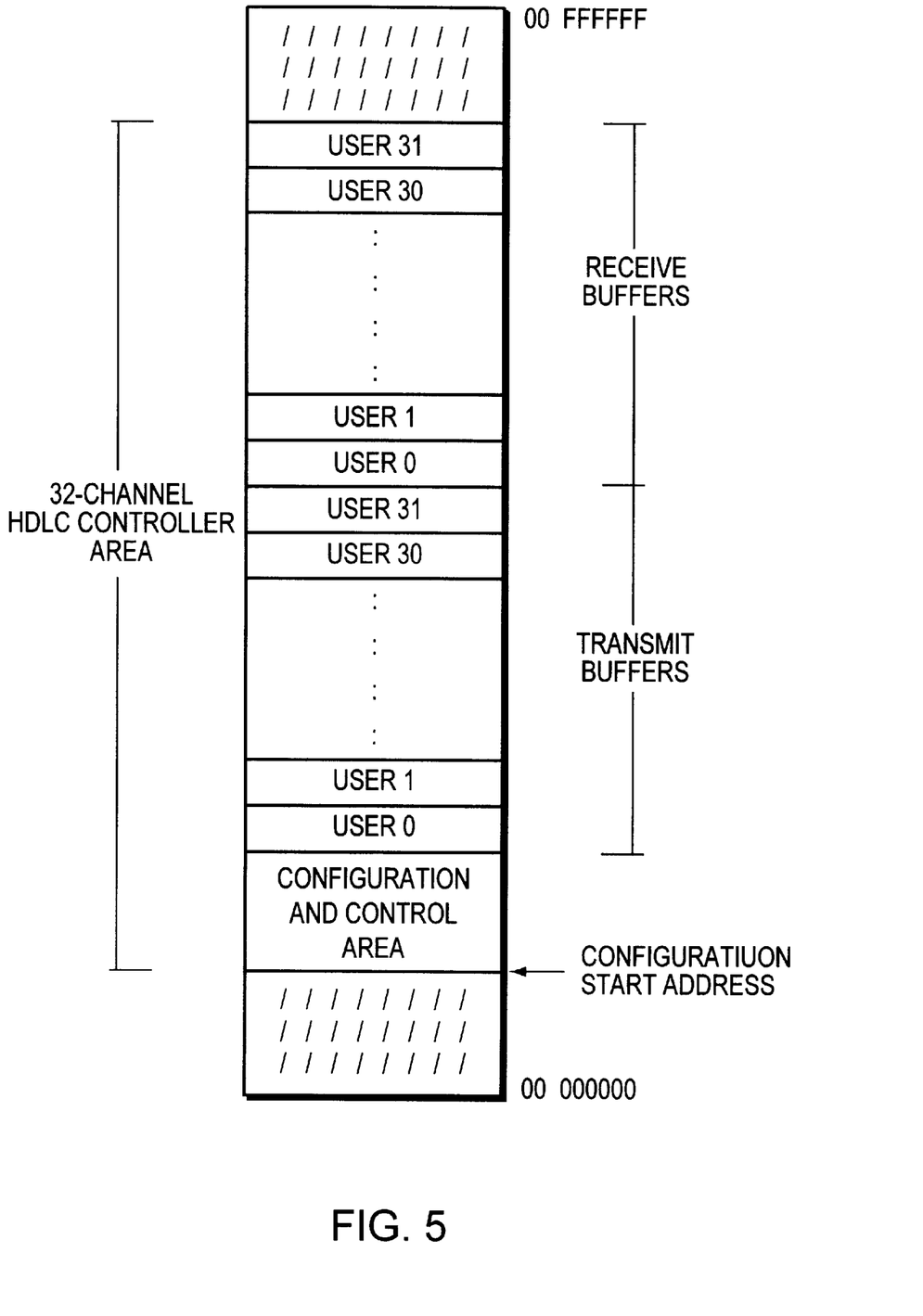
FIG. 5 represents a HDLC controller memory organization.

The organization of the HDLC controller memory is shown in FIG. 5. Three areas are dedicated to the HDLC controller (200): the configuration and control area, the transmit data buffers where each transmit buffer corresponds to a timeslot dedicated to a user and the receive data buffers where each receive buffer corresponds to a timeslot dedicated to a user.

In FIG. 5, the configuration and control area is located in memory (180) at a predefined address called 'configuration start address'. The HDLC controller (200) has a 5-bit input configuration bus, pins C0–4. These inputs are hardwired and an internal decode algorithm determines this configuration start address. When the HDLC controller (200) detects a pulse on its chip select input, pin -SCC_CS, it performs a memory read operation at the configuration start address.

Figure 6:
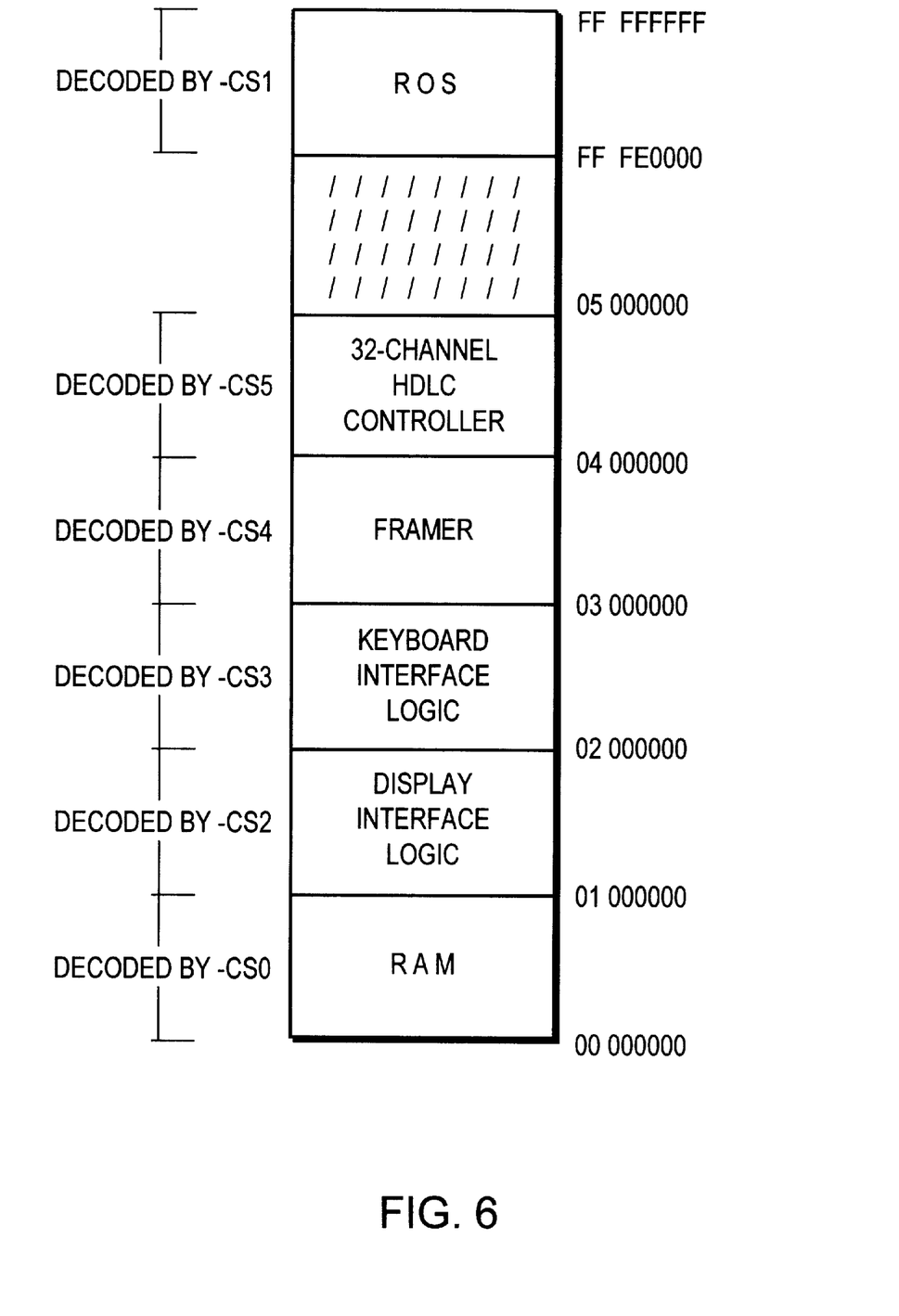
FIG. 6 represents a processor memory map.

At power up, processor (100) initializes the on-board hardware that are the keyboard interface logic (150), the display interface logic (160), the framer (220) and the memory (180) with the configuration and control area, the transmit and receive buffers. A memory map of processor (100) is shown in FIG. 6. The control area is a mailbox between processor (100) and HDLC controller (200).

When processor (100) has to transmit a data file of a frame for a user onto the network link, it performs the following operations:

- it loads the data file into the transmit data buffer corresponding to the user,
- it writes the corresponding transmit operation for this user in the configuration and control area,
- it wakes up the controller (200) by generating a pulse on its chip select input pin, then
- the HDLC controller (200) takes control of memory (180), reads the configuration and control area to know the type of operation it has to perform and transmits each byte of the data file on the timeslot corresponding to the user. This timeslot is transmitted onto the network link through framer (220) and Line Interface Unit (230), and
- at the end of data file transmission, the HDLC controller (200) activates its interrupt signal (102) and returns to idle state.

When a receive timeslot carries a byte for a user, this byte is transmitted from the network to HDLC controller (200) through framer (220) and Line Interface Unit (230). Then HDLC controller (200) performs the following operations:

- it stores each received byte in memory (180) into the receive buffer dedicated to the user,
- at the end of the data file reception, it writes the corresponding received status for this user in the configuration and control area, and
- it activates its interrupt signal (102) to alert processor (100) and returns to idle state.

Frame Transmission

When a data file of a frame is stored into a transmit data buffer, processor (100) performs a memory write operation to wake-up HDLC controller (200). This will now be described in association with the timing diagrams shown in FIG. 7.

Figure 7:
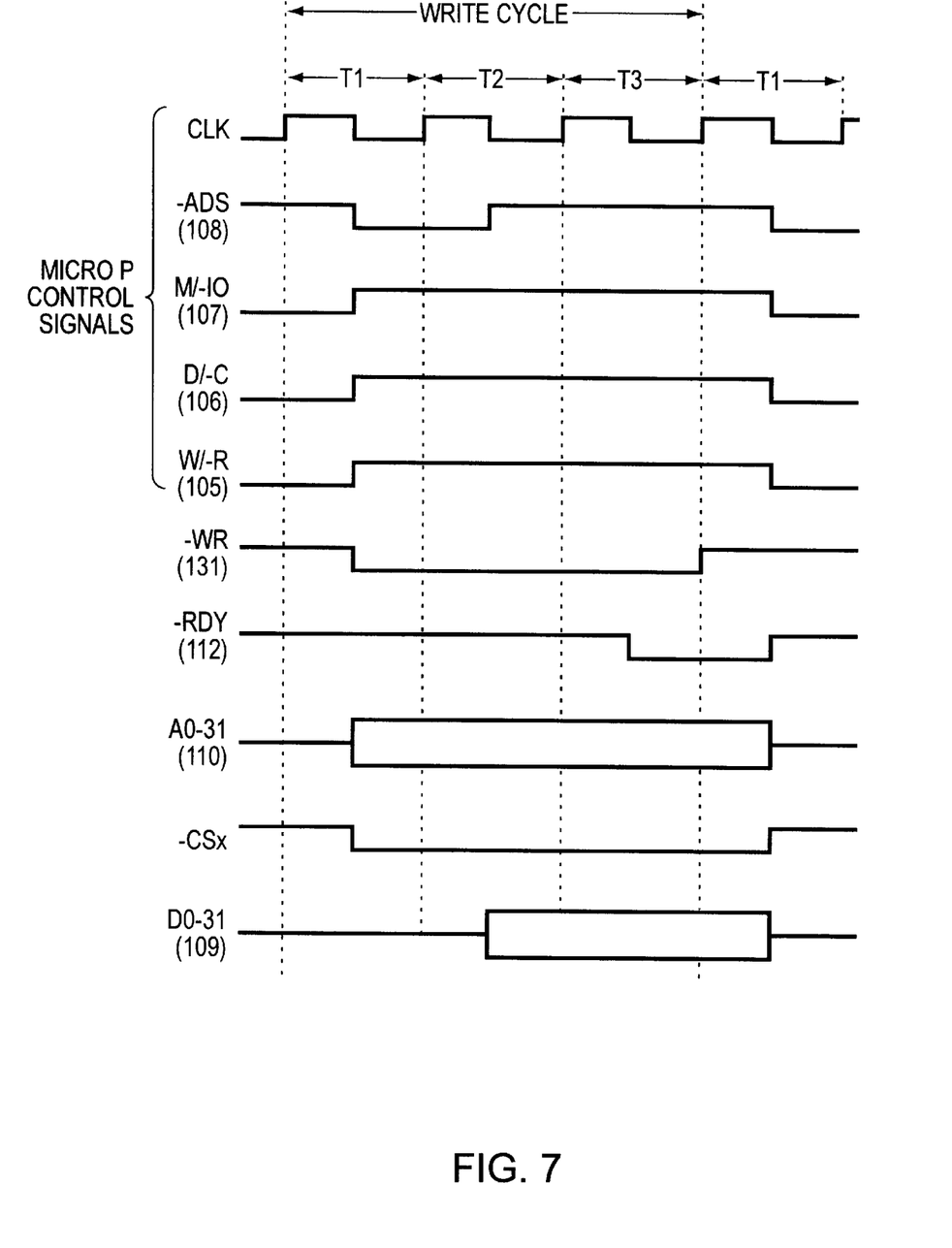
FIG. 7 represents a processor memory write timing.

A processor cycle lasts three periods of clock named T1, T2 and T3. During T1, processor (100) activates address data strobe lead (108), memory/IO lead (107), data/control lead (106), read/write lead (105) and outputs onto address bus A0–31 the address of HDLC controller.

It should be noted that HDLC controller (200) tri-states its output signals -SCC_ADS, address bus A0–31 and data bus D0–31 until processor (100) activates its bus acknowledge signal HOLDA. Conversely, control logic 2 (215) tri-states its read and write output signals -RD and -WR.

The address data strobe signal -ADS (108) is activated during one clock period while the other signals are activated during the entire write cycle. When address data strobe signal -ADS is deactivated, processor (100) outputs the data onto data bus D0–31 (109).

Control logic 1 (130) decodes the status of memory/IO output M/-IO (107), data/control output D/-C (106) and read/write output W/-R (105) and activates its output write signal -WR (131) until processor (100) activates its bus acknowledge signal HOLDA (104). In addition, it should be noted that control logic 2 (215) tri-states its output signals memory write -WR (131) and memory read -RD (132) until processor (100) activates its bus acknowledge signal HOLDA (104).

The address is decoded by address decode 2 (190) which activates its output signal -CS5 (201) during the write cycle. HDLC controller (200) receives this output signal on its chip select input -SCC_CS (201) that a data file is to be transmitted onto the network.

The processor write operation is completed at the end of T3 when processor (100) receives from control logic 1 (130) a one-clock pulse on the ready lead -RDY. At this time, processor (100) deactivates memory/IO output (107), data/control output (106) and read/write output (105) and removes the address from the address bus A0–31.

The HDLC controller (200) being alerted, performs a memory read operation in the configuration and control area for transmitting the data file onto the network. This will now be described in association with the timing diagrams shown in FIG. 8.

Figure 8:
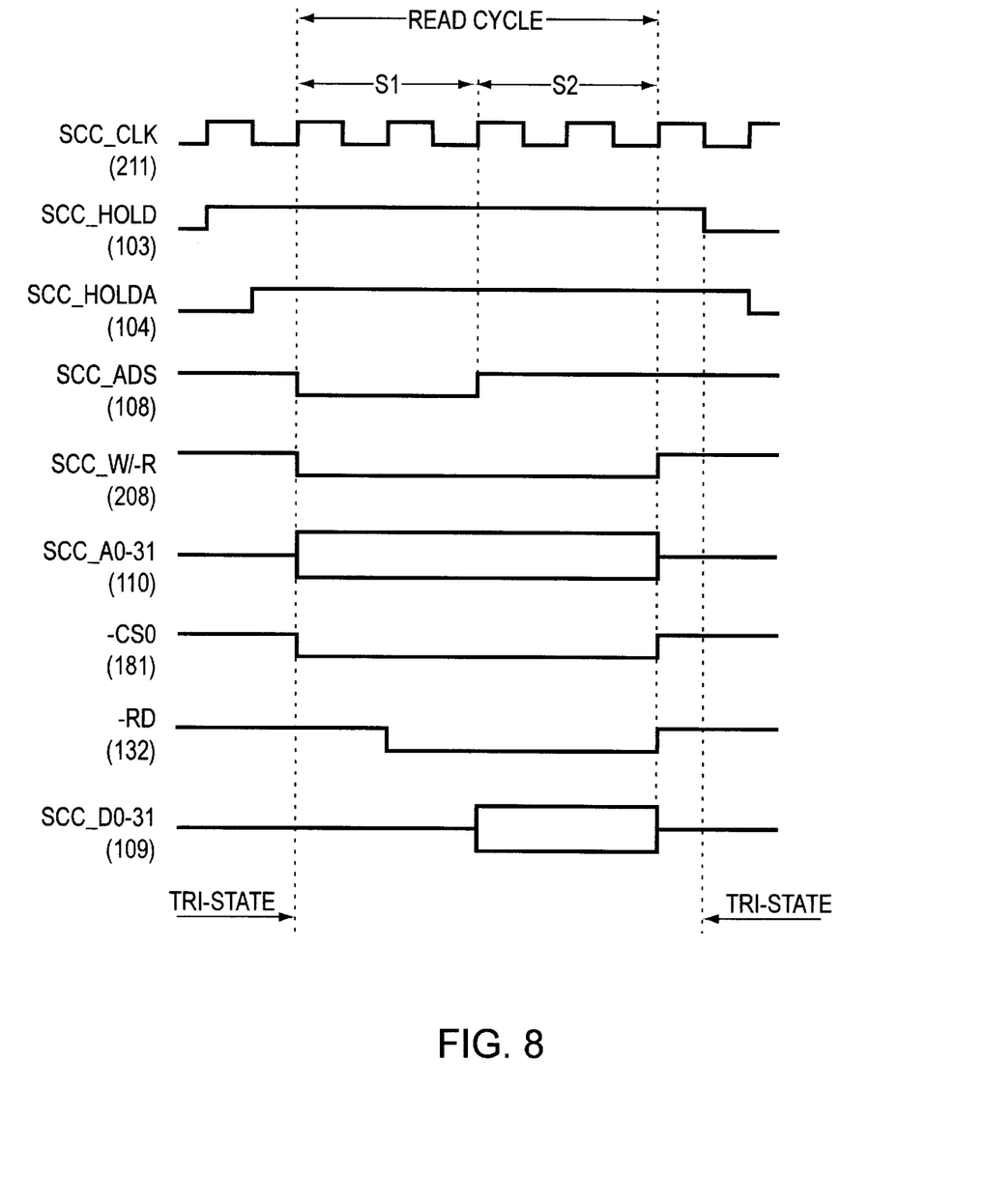
FIG. 8 represents a HDLC controller memory read timing for the transmission mode.

Being a master peripheral, HDLC controller (200) requests the system bus by activating the bus request SCC_HOLD signal on lead (103). When processor (100) detects this request, it takes three actions:

- it terminates its current cycle,
- it tri-states read/write output W/-R (105), data/control output D/-C (106), Memory/IO output M/-IO (107), address data strobe output -ADS (108), address bus A0–31 (110) and data bus D0–31 (109),
- it activates the bus acknowledge signal HOLDA on lead (104).

The activation of HOLDA signal (104) tri-states the output signals of control logic 1 (130) and enables the output signals of control logic 2 (215).

When HDLC controller (200) detects the activation of the bus acknowledge signal on lead (104), it activates the address data strobe signal -SCC_ADS (108), the read signal SCC_W/-R (208) and outputs the start configuration address onto the address bus SCC_A0–31 (110). The address data strobe signal -SCC_ADS (108) is activated during S state while the other signals are activated during the entire read cycle.

The content of address bus SCC_A0–31 (110) is decoded by address decode 1 (140) which activates the output memory chip select signal -CS0 (181). Control logic 2 (215) generates the memory read signal (132). Memory (180) receiving an address, an active chip select signal and an active read signal, outputs onto its data bus the content of the corresponding memory location.

HDLC controller (200) reads the data bus SCC_D0–31 (109) at the end of S2 state on the rising edge of the clock. At this time, the read cycle is completed. Therefore, HDLC controller (200) deactivates the bus request signal HOLD (103) and tri-states the address data strobe signal -SCC_ADS (108), the read signal SCC_W/-R (208), the address bus SCC_A0–31 (110) and the data bus SCC_D0–31 (109). Processor (100) detects the deactivation of bus request signal HOLD on lead (103), deactivates its bus acknowledge signal HOLDA on lead (104) and resumes its activity. The deactivation of HOLDA signal enables the output signals of control logic 1 (130) and tri-states the output signals of control logic 2 (215).

HDLC controller (200) performs several memory read operations to read the control area. At this stage, it knows that a data file of a frame in a user transmit buffer is ready to be transmitted. HDLC controller (200) reads each byte of the data file and transmits them onto the network link through framer (220) and Line Interface Unit (230).

At the end of the data file transmission, HDLC controller (200) updates the control area and activates the interrupt signal SCC_INT on lead (102) to alert processor (100) that the transmission is completed and the HDLC controller (200) returns to idle state.

Frame Reception

When a data file of a frame is received from the network by Line Interface Unit (230) and framer (220), each byte is transmitted to HDLC controller (200). The latter controls the byte transfer into a receive buffer of memory (180). This will now be described in association with the timing diagrams shown in FIG. 9.

Figure 9:
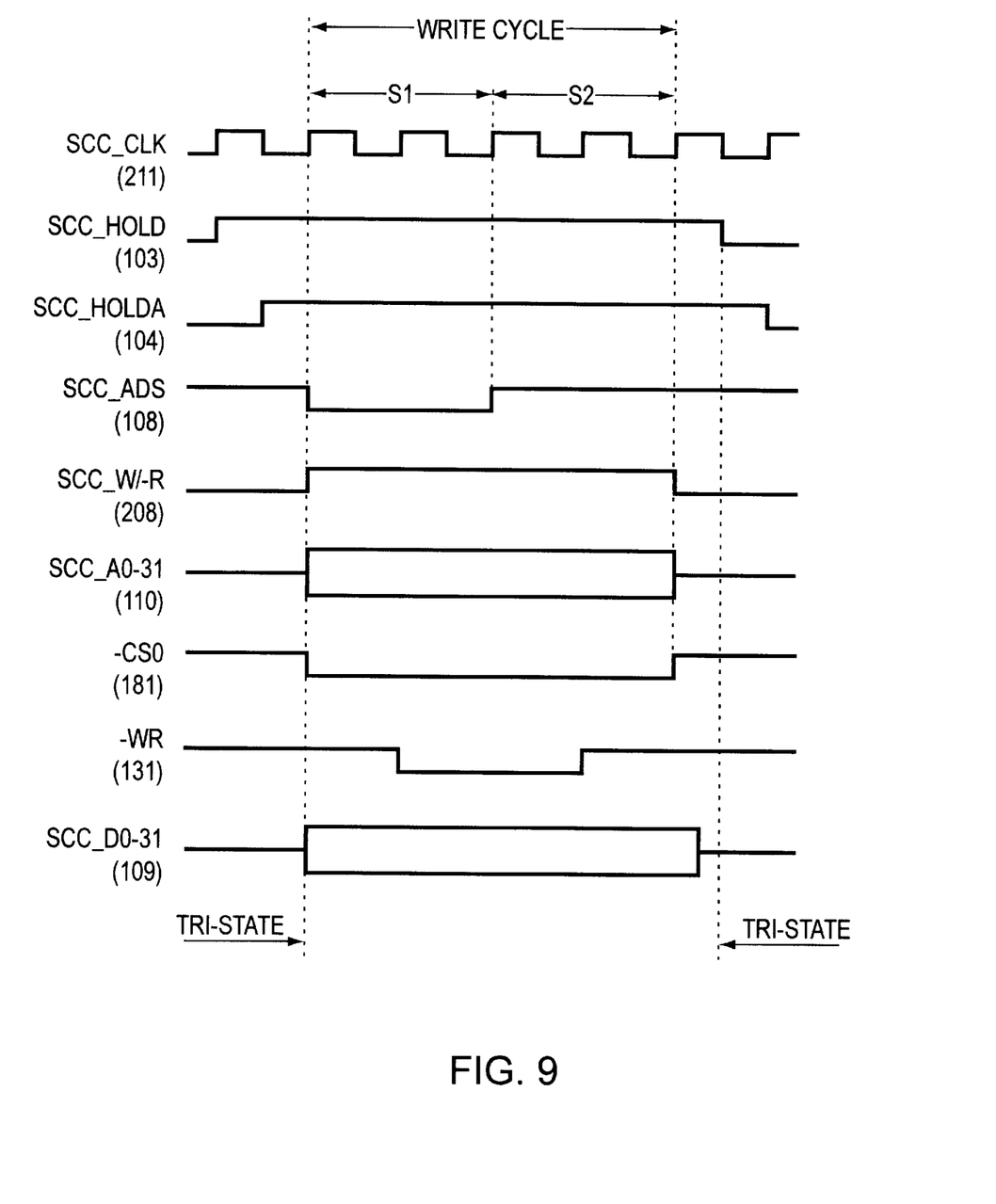
FIG. 9 represents a HDLC controller memory write timing for the reception mode.

Being a master peripheral, HDLC controller (200) requests the system bus by activating the bus request SCC_HOLD signal on lead (103). When processor (100) detects this request, it takes three actions:

it terminates its current cycle, it tri-states read/write output W/-R (105), data/control output D/-C (106), Memory/IO output M/-IO (107), address data strobe output -ADS (108), address bus A0–31 (110) and data bus D0–31 (109), it activates the bus acknowledge signal HOLDA on lead (104).

The activation of HOLDA signal (104) tri-states the output signals of control logic 1 (130) and enables the output signals of control logic 2 (215).

When HDLC controller (200) detects the activation of the bus acknowledge signal on lead (104), it activates the address data strobe signal -SCC_ADS (108), the write signal SCC_W/-R (208), outputs the receive buffer start address onto the address bus SCC_A0–31 (110) and outputs the received bytes onto the data bus SCC_D0–31 (109). The address data strobe signal -SCC_ADS (108) is activated during S state while the other signals are activated during the entire write cycle.

The content of address bus SCC_A0–31 (109) is decoded by address decode 1 (140) which activates the output memory chip select signal -CS0 (181). Control logic 2 (215) generates the memory write signal (131). On the rising edge of the latter signal, the received bytes are stored in memory (180).

At the end of S2 state, the write cycle is completed. Therefore, HDLC controller (200) deactivates the bus request signal HOLD and tri-states the address data strobe signal -SCC_ADS, the write signal SCC_W/-R, the address bus SCC_A0–31 and the data bus SCC_D0–31.

Processor (100) detects the deactivation of bus request signal HOLD on lead (103), deactivates its bus acknowledge signal HOLDA on lead (104) and resumes its activity. The deactivation of HOLDA signal enables the output signals of control logic 1 (130) and tri-states the output signals of control logic 2 (215).

HDLC controller (200) performs memory write operations until the entire data file is received. At the end of the reception, the HDLC controller (200) updates the control area and activates the interrupt signal SCC_INT on lead (102) to alert processor (100) that the reception is completed and the HDLC controller (200) returns to idle state.

If during the reception of a data file, the framer (220) detects an error, it activates its interrupt signal INT on lead (101) to alert processor (100) that an error has occurred.

SOFTWARE DESCRIPTION OF THE INVENTION

The current invention is a tool designed to test a G.706 telecommunication equipment to be conformed to the European Telecommunication Standard Institute (ETSI) specifications and more precisely to the ETS-300-011-C.4. This specification describes the test procedure for frame and multiframe alignment and for CRC handling. This specification defines a set of keywords and a structure of a test case.

A list of keywords is quoted hereunder where each keyword defines a specific value carried by timeslot 0. For example, the FAS keyword defining a correct E1 frame alignment is coded 'C0011011', C being part of the 4-bit CRC referred as C1–C4 in each even frame (refer to FIG. 2 for the E1 multiframe structure). In order to have more details, one should refer to the ETS-300-011-C-4.

FAS: Frame with correct Frame Alignment Signal (FAS), correct bits C1 to C4 and correct CRC Multi Frame Alignment Signal (MFAS) in time slot 0.

/FAS: Frame with no correct FAS, correct bits C1 to C4 and correct MFAS in timeslot 0.

BIT2: Bit 2 of timeslot 0 not containing the frame alignment signal.

FRAMEA: Two consecutive frames having FAS in the first timeslot 0, Bit2=1 in the second timeslot 0 and no contiguous group of seven bits which simulates the FAS in timeslots 1 to 31.

FRAMEB: Two consecutive frames having FAS in the first timeslot 0, Bit2=1 in the second timeslot 0, simulated Bit2=1 in the first timeslot 31 and simulates FAS (no corresponding MFAS) in the second timeslot 31.

FRAMEC: Two consecutive frames having /FAS in the first timeslot 0, Bit2=1 in the second timeslot 0 simulated Bit2=1 in the first timeslot 31 and simulates FAS (no corresponding MFAS) in the second timeslot 31.

SMFA: Sub-multiframe having correct generation of C1 to C4 bits.

SMFB: Sub-multiframe having incorrect generation of C1 to C4 bits.

MFA: Multiframe having correct FAS, Bit2=1, MFAS and correct C1 to C4 bits.

MFB: Multiframe having correct FAS, Bit2=1, but incorrect MFAS and correct C1 to C4 bits.

NOF: Normal Operational Frame, meaning "bit3=0" of odd frames.

RAI: Remote Alarm Indication meaning "bit3=1" of odd frames.

Xn: 'X' indicates that the sequence defined in the previous line may be repeated before entering the next subsequence. If the parameter 'n' is defined, this sequence shall be repeated 'n' times.

Figure 10:
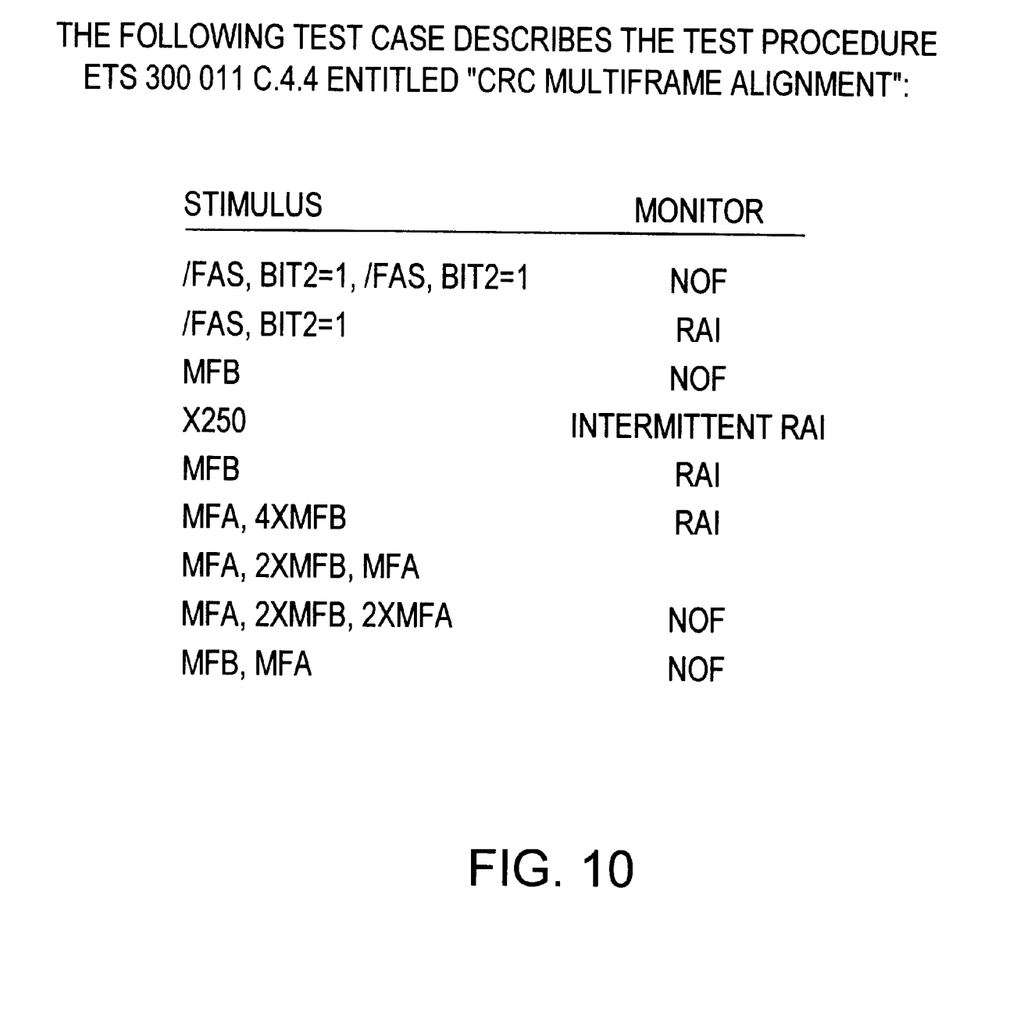
FIG. 10 gives an ETSI Test Case Example.

FIG. 10 illustrates an example of a test case according to a test procedure ETS 300-011-C4.4.4 entitled 'CRC Multiframe Alignment'. The latter is made of stimuli which is a keyword or a sequence of keywords (on the left column) and monitor keywords (on the right column). The stimuli are sent to the network to test the attached device and the monitor contains expected response from the tested device. Each test response is reported through the Remote Alarm Indication (RAI) which is a bit3 of odd frames sent on timeslot 0 by the tested device and compared to the expected response in the list.

The purpose of this test tool is to generate a set of stimuli complied with the CCITT G.706 recommendations and to analyze and compare the value of the test response returned by the tested device with the expected response.

User Interface in Transmission

Figure 11:
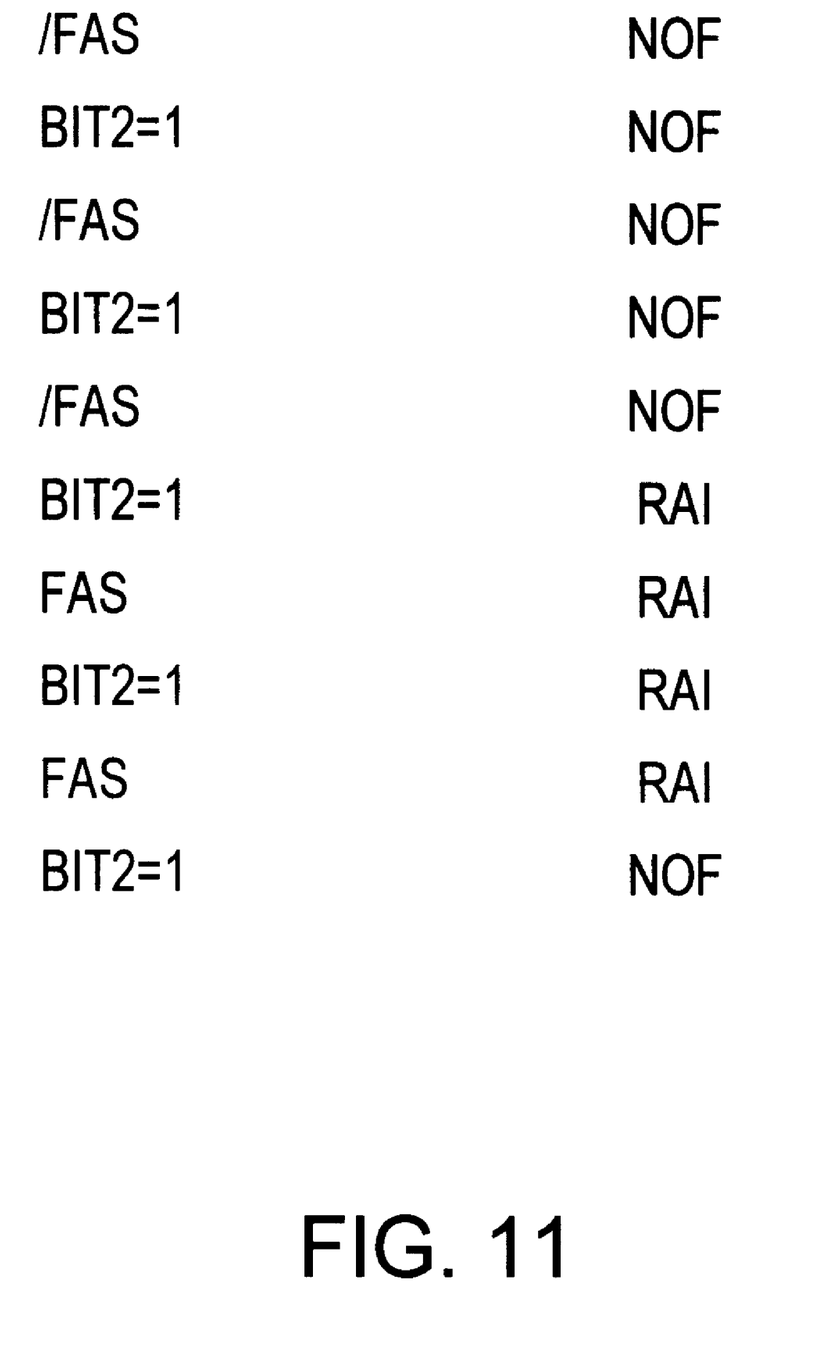
FIG. 11 gives a Test Data File Example.

A test case data file is created containing the test sequence an example of which is illustrated in FIG. 11. This test sequence is composed of transmit stimuli on the left column and expected response on the right column that must be received from the tested device.

A translation program which converts the stimuli into a byte or a plurality of bytes in compliance with the CCITT recommendations, described later on in FIG. 12, performs the following operations:

- it splits the test data file (1801) into a transmit user file (1803) stored on the hard disk and a receive user file (1804) also stored on the hard disk. This hard disk is not shown in FIGS. 4A and 4B but its implementation is assumed to be known by the man skilled in the art since it does not differ from a usual PC system board. This transmit user file contains the transmit stimuli and the receive user file contains the expected response;
- it converts each transmit stimuli of the transmit user file into either a single 8-bit value or a series of 8-bit values which represent the value of the transmit 8-bit timeslot 0 of the frames; and
- It converts each expected response of the receive user file into either a single 8-bit value or a series of 8-bit values which represent the value of the receive 8-bit timeslot 0 of the frames.

For example, the FAS keyword is coded C0011011 in a frame while the MFA keyword is coded in the 16 frames as:
C0011011 in frame 0,
01011111 in frame 1,
C0011011 in frame 2,
01011111 in frame 3,
C0011011 in frame 4,
11011111 in frame 5,
C0011011 in frame 6,
01011111 in frame 7,
C0011011 in frame 8,
11011111 in frame 9,
C0011011 in frame 10,
11011111 in frame 11,
C0011011 in frame 12,
11011111 in frame 13,
C0011011 in frame 14,
11011111 in frame 15.

Each time a frame is to be transmitted, an 8-bit value is sequentially downloaded in the user 0 transmit buffer (1808) of RAM (180) and the processor wakes up HDLC controller as described previously in the hardware description to send the content of this buffer to the network. As soon as the transmission begins, the receive buffers of RAM (180) are cleared and ready to receive from the network the incoming bytes.

User Interface in Reception

When the processor receives the receive interrupt signal SCC_INT on lead (102) from HDLC controller (200), the interrupt routine stores the content of the user 0 receive buffer (1811) onto the PC hard disk, called receive file.

Then, the response of the tested device is automatically analyzed by comparing the content of the receive file to the content of the receive user file. If no error is detected, the tested device successfully passed the ETSI test sequence defined by the user.

Translation Program Description

Figure 12:
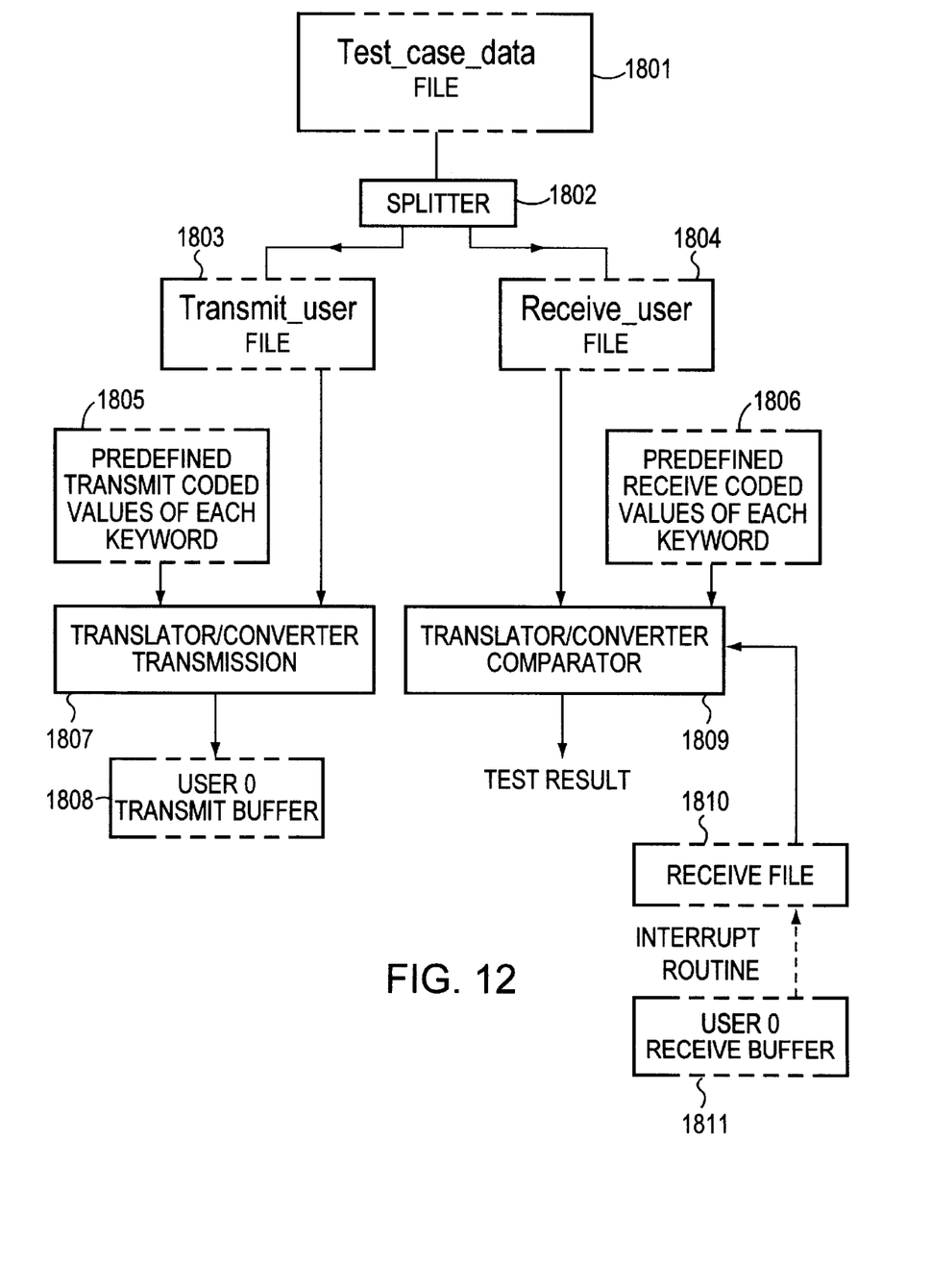
FIG. 12 shows a translation program flow chart.

The flow chart of this translation program is shown in FIG. 12. This program is composed of three main functions:

Splitter (1802);
Translator or Converter Transmission (1807);
Translator or Converter Comparator (1809).

The splitter function (1802) performs the following functions described hereafter in pseudo-code:

```
Open test case data file (1801) in read only mode
Open transmit user file (1803) in write mode
Open receive user file (1804) in write mode
While (not End Of File)
    Input Line = Get Line (testcase data file)
    Left part = Characters 1 to 40 (Input Line)
    Right part = Characters 41 to 80 (Input line)
    write Left part into transinit user file
    write Right part into receive user file
```

At the end of the splitter function, the transmit user file (1803) contains the keywords of the transmit stimuli and the receive user file (1804) contains the keywords of the expected response.

In transmission function, for each keyword of the transmit user file (1803), the translator/converter function (1807) scans a file containing predefined Transmit Coded Values of each Keyword (1805) to identify the corresponding 8-bit coded value of the keyword. This value is then stored into user 0 transmit buffer (1808) for transmission.

In reception function, the interrupt routine stores each user 0 receive buffer (1811) into a receive file (1810) on the hard disk. Meanwhile, the translator/converter (1809) converts the receive user file (1804) by scanning a file (1806) that contains predefined Transmit Coded Values of each keyword are converted by the translator/converter comparator (1809). This file (1806) enables to identify the 8-bit coded value of each keyword of receive user file (1810) so as to compare it to the receive file (1810). If no error is detected during the comparison, the device under test passed the ETSI test sequence defined by the user.

We claim:

1. A test apparatus adapted to be connected between network lines (30) and a workstation (10) for determining the conformity of an attached telecommunication device (40) to test procedures that are performed owing to communication frames containing N timeslots, said test apparatus characterized in that it comprises:

means (200) for generating in at least one of said timeslots of each communication frame first keywords to be tested by the attached telecommunication device (40) and second keywords of expected response in at least one of received timeslots from the communication device; and means (200) for analyzing at least one response timeslot of communications frames received from the telecommunication device (40) to compare with expected response timeslot so as to detect any error in the test procedures.

2. The test apparatus of claim 1 used in accordance with CCITT G.706 recommendations where a first 8-bit timeslot (timeslot#) of each transmit and receive frames is tested.

3. The test apparatus of claim 1 wherein a number of M frames composes a multiframe characterized in that:

said generating means (200) generates an 8-bit timeslot of each transmit frame to modify frame and multiframe alignments and cyclic redundancy check (CRC) test procedures; and said analyzing means (200) stores a received 8-bit timeslot of each receive frame to monitor an indication bit ('A' bit) detecting an error of said tested device.

4. The test apparatus of claim 3 further comprises:

means (230) for interfacing said network lines, generating clock signals (206,207) and recovering receive data; and means (220) for checking for errors in the response timeslot of each frame to activate an interrupt signal (101) to a processor (100).

5. A test apparatus adapted to be connected between network lines (30) and a workstation (10) for determining the conformity of an attached telecommunication device (40) to test procedures that are performed owing to at least one communication frame (M) containing N timeslots, or multi-frames containing M frames, said test apparatus characterized in that it comprises:

controller (200) for generating in at least one of said timeslots of each communication frame keywords to be tested by the attached telecommunication device (40);

controller (200) for analyzing at least one response timeslot of communication frames received from the telecommunication device (40) to compare with expected response timeslot so as to detect any error in the test procedures;

controller (200) that generates an 8-bit timeslot of each transmit frame to modify frame and multiframe alignments and cyclic redundancy check (CRC) test procedures; and controller (200) stores a received 8-bit timeslot of each receive frame to monitor an indication bit ('A' bit) detecting an error of said tested device;

wherein said controller (200) is composed of 32 independent HDLC controllers, one per timeslot for both the transmission and reception of communication frames.

6. The test apparatus of claim 5 wherein said controller (200) has a memory organization that comprises:

a configuration and control area;

N transmit buffers, each one being dedicated to a timeslot; and

N receive buffers, each one being dedicated to a timeslot.

7. A test method for determining the conformity of a telecommunication device (40) to test procedures owing to communication frames containing N timeslots, said communication frames being serially carried by network lines (30) connecting said telecommunication device (40) and a workstation (10), said test method characterized in that it comprises the steps of:

generating (1801) first keywords to be tested by the telecommunication device (40) in at least one of the transmit timeslots of each communication frame and second keywords of expected response in at least one of receive timeslots from the telecommunication device; and analyzing said at least one of receive timeslots received from the telecommunication device (40) to compare to the expected receive timeslot so as to detect any error in the test procedures.

8. A test method for determining the conformity of a telecommunication device (40) to test procedures owing to communication frames containing N timeslots, said communication frames being serially carried by network lines (30) connecting said telecommunication device (40) and a workstation (10), said test method characterized in that it comprises the steps of:

generating (1801) first keywords to be tested by the telecommunication device (40) in at least one of the transmit timeslots of each communication frame and second keywords of expected response in at least one of receive timeslots from the telecommunication device;

analyzing said at least one of receive timeslots received from the telecommunication device (40) to compare to the expected receive timeslot so as to detect any error in the test procedures; wherein each said keyword is converted into a byte or a plurality of bytes and further comprising:

splitting (1802) said first keywords to be transmitted and said expected second keywords so as to store each one in a transmit user file and a receive user file;

converting (1807) said first keywords into a byte coded according to a first predefined translator file (1805) so as to store each value in a user transmit buffer (1808) to be transmitted onto said network lines (30) to test said attached telecommunication device (40); and converting (1809) said second keywords into a byte coded according to a second predefined translator file (1806) so as to store each value in a user receive buffer to be compared to a receive file (1810) of telecommunication device response.

9. The method of claim 8 wherein said steps of generating keywords and analyzing response timeslots are performed by controlling means (200) composed of 32 independent HDLC controller, one per timeslot for both the transmission and reception of communication frames; and wherein said generating means (200) has a memory organization that comprises:

a configuration and control area;

N transmit buffers, each one dedicated to a transmit timeslot; and

N receive buffers, each one dedicated to a receive timeslot.

10. The method of claim 9 wherein an 8-bit timeslot of each transmit frame is used to modify frame and multiframe alignment and cyclic redundancy check test procedures, and an 8-bit timeslot of each receive frame is used to monitor an error indication bit (bit 'A') of said telecommunication device (40).

11. A test method for testing a device compliant to a communication standard comprising the steps of:

generating and inserting in at least one time slot of a multi time slot frame information to be used to modify frame alignment or cyclic redundant check (CRC); and storing in a buffer contents received in the at least one time slot to monitor an alarm indication bit reflecting the behavior of tested device.

12. The method of claim 11 further including the step of inserting test data in other time slots.

13. The method of claims 11 or 12 wherein the communication standard includes CCITT G.706.

* * * * *